H. J. HEIDER.
TRACTOR PLOW.
APPLICATION FILED JULY 27, 1917.

1,373,613.

Patented Apr. 5, 1921.
3 SHEETS—SHEET 1.

Witnesses:
Stephen Seborg

Inventor.
Henry J. Heider
By Charles C. Bulkley Attys

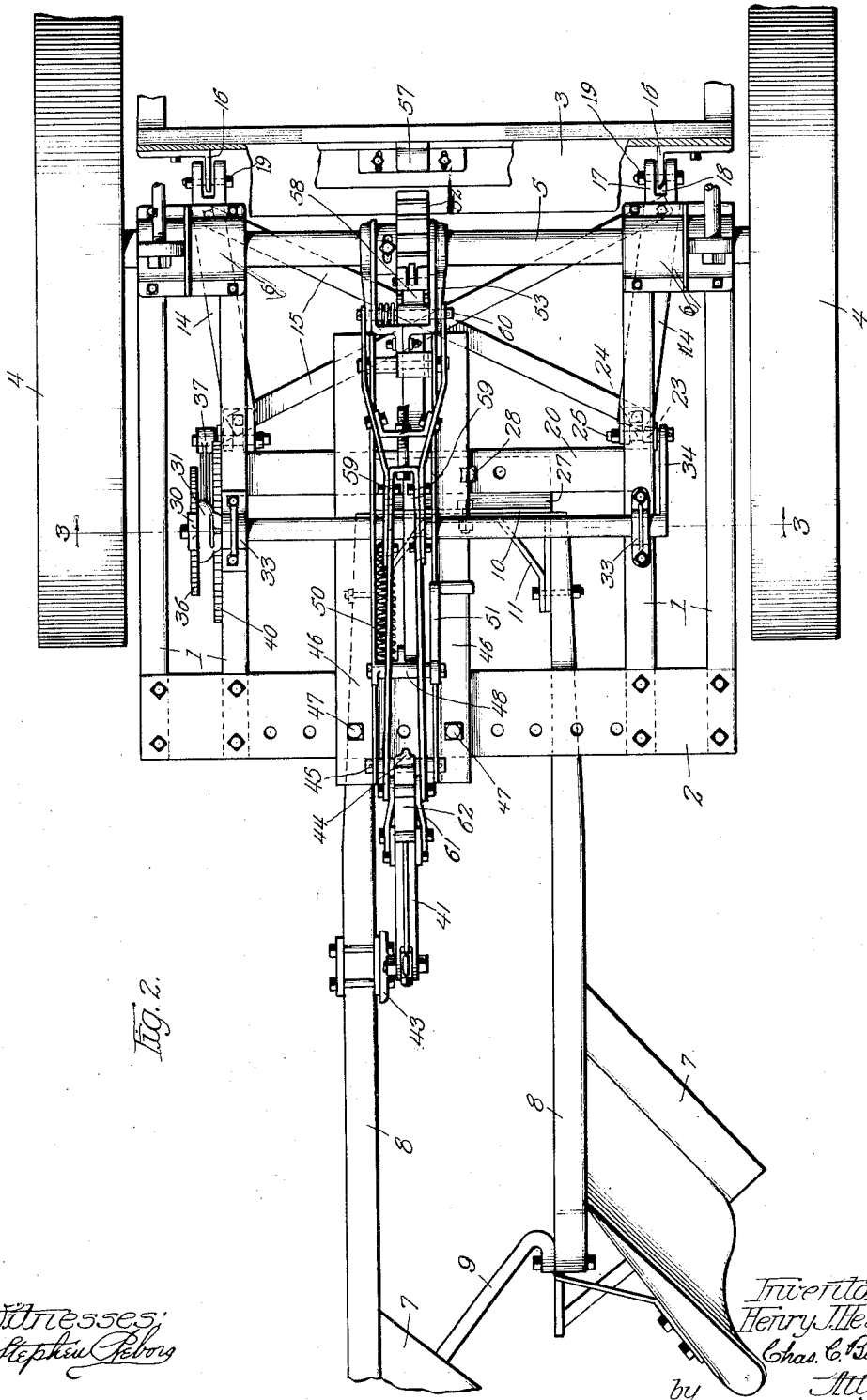

UNITED STATES PATENT OFFICE.

HENRY J. HEIDER, OF CARROLL, IOWA, ASSIGNOR TO ROCK ISLAND PLOW COMPANY, OF ROCK ISLAND, ILLINOIS, A CORPORATION OF ILLINOIS.

TRACTOR-PLOW.

1,373,613.         Specification of Letters Patent.         Patented Apr. 5, 1921.

Application filed July 27, 1917. Serial No. 183,114.

*To all whom it may concern:*

Be it known that I, HENRY J. HEIDER, a citizen of the United States of America, and resident of Carroll, Carroll county, Iowa, have invented a certain new and useful Improvement in Tractor-Plows, of which the following is a specification.

My invention relates to an improved tractor, plow, and my object is to provide an improved structure of this character which will be simple, durable and reliable in construction, and effective and efficient in operation. Other objects of my invention will appear hereinafter.

My invention consists in the features of novelty exemplified by the construction, combination, and arrangement of parts hereinafter described, shown in the accompanying drawings, and more particularly pointed out in the appended claims.

Referring to the accompanying drawings:

Fig. 2 is a top plan view of the structure shown in Fig. 1.

Fig. 3 is a transverse vertical section substantially on the line 3—3 of Fig. 2.

Fig. 4 is a detail, partly broken away, of the lifting mechanism.

Fig. 5 is an enlarged detail of the foot controlled latch.

Fig. 6 is a detail section on the line 6—6 of Fig. 3.

Figure 1:
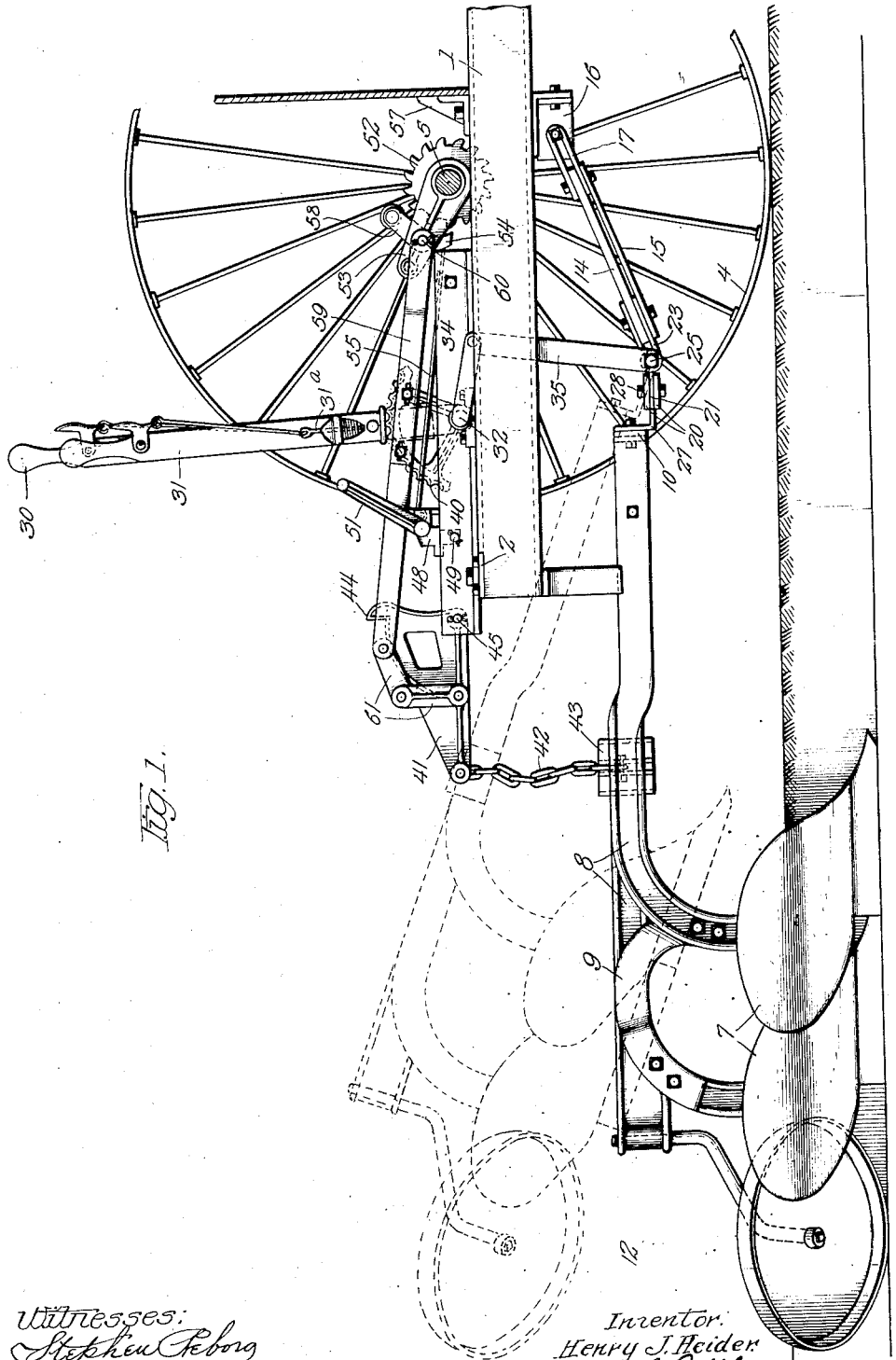
Figure 1 is a view in side elevation of a structure embodying my invention, one of the tractor wheels being removed to better disclose the operating parts.

In the drawings I illustrate the rear end of a tractor which may be regarded as representative of any suitable type of tractor for the purposes of providing motive power and supporting means for the plows. This tractor shown is of the type constituting the subject matter of the Heider United States Patents, Nos. 1,055,635 and 1,154,767 dated March 11, 1913, and September 28, 1915, respectively, and is provided with four supporting wheels, although only the rear wheels are shown and a supporting frame. The power plant is located at the forward end of the machine and the power is transmitted by suitable mechanism to the rear wheels where it is applied for propelling the vehicle. At its rear end the tractor has a comparatively low horizontal frame consisting in general of the two pairs of longitudinal frame bars 1, connected at their rear ends by a top plate 2, and by a transverse angle bar 3, somewhat forward of the rear ends and on the underside of the frame. A cover is placed on this frame to provide a platform for the operator, although this platform is removed for the sake of clearness. The two large rear supporting wheels 4 are mounted on the axle 5, which is positioned above the frame and is journaled in bearings 6 on the top of said frame.

The plow, as illustrated in the drawings, has two bottoms 7, each having a beam 8 extending forwardly beneath the tractor. The beams are connected by a rear diagonal brace 9 and at their forward ends by means of a transverse angle bar 10. The diagonal braces 11 are provided to increase the rigidity and strength of the forward end of the structure. This construction provides a rigid unit capable of being bodily lifted and lowered, as desired. When the plow is in working position in the ground, the rear end thereof is supported by a caster wheel 12 of the usual type. The forward end of the plow structure is positioned beneath the tractor frame so as to bring the plow and tractor into as close and compact relation as possible. The plow unit is pivotally connected to an underhung draft frame on the tractor. This draft frame has two side bars 14 connected by the cross braces 15 which render the frame rigid against lateral distortion. The forward corners of this frame are pivotally connected to brackets 16 fastened to the transverse frame bar 3, so that the frame may be swung vertically on these pivots or hinges to regulate the working depth of the plow, as hereinafter described. The side bars of the frame have loop-members 17 which are provided with wide slots 18 at their ends to embrace the brackets, and pivot bolts 19 are passed through these loops and the brackets, which construction provides comparatively loose pivotal connections or hinges with the tractor frame so that the draft frame may be warped considerably to regulate the level working relation of the plows, as hereinafter described. At its rear end the draft frame has two superposed bars 20 spaced apart by the spacer members 21 which are clamped therebetween by the bolts 22. These spaced bars are hinged to the draft frame which has loop members 23 at the rear ends of its side bars and these loop members are forked to provide space for the loops 24 on the spacer members. The pivot bolts 25 are inserted through these loops. This hinge construction, like that at the forward corners of the frame, permits the warping of the frame.

The forward end of the plow frame has an angle member fastened thereto, the flange 27 of which extends forwardly and is positioned between the two bars 20. A pivot bolt 28 is inserted through holes in the bars 20 and flange 27 which provides a draft connection between the draft frame and the plow, which connection is pivotal in a lateral direction, whereby sufficient flexibility between the tractor and the plow is provided to permit the turning of the tractor without distorting or straining the mechanism. Because of the width of the flange 27, positioned between the bars 20, the plow is rigidly and substantially connected with the draft frame so far as the warping action of the draft frame is concerned for the purpose of leveling the plows. The bars 20 have several holes, whereby the pivotal point may be shifted laterally to shift the line of draft as desired.

The mechanism for leveling the plows and regulating the working depth thereof is positioned on the upper side of the tractor platform and is manipulated by means of two hand levers 30 and 31 upstanding in position for the operator. These levers are mounted on a transverse shaft 32 which is journaled in bearings 33 on the tractor frame. The lever 30 is fastened on one end of the shaft, and the shaft at its other end has a forwardly extending arm 34 which has a depending link 35 pivotally connected at its lower end on the pivot bolt 25 at the rear corner of the draft frame. Thus when the lever 30 is rotated, it operates to raise or depress this corner of the draft frame, and when the other corner of the frame is held against movement the effect is to warp the draft frame and turn the plow frame on a horizontal axis whereby to level the plow as conditions require. The other lever 31 is mounted upon a toothed locking quadrant 36 for the lever 30, this quadrant being rotatable on the shaft 32. This quadrant also has a forwardly extending arm 37 connected by a link 38 to the pivotal bolt 25 of the other corner of the draft frame, whereby the manipulation of the lever 31 will raise or depress this corresponding corner of the draft frame. However, since the lever 30 is locked in its adjusted position, by means of the grip-operator latch 30ᵃ on the lever 30, to the quadrant 36, on which the lever 31 is mounted, the result of operation of the lever 31 is to raise or depress both corners of the draft frame in unison, thus elevating or depressing the forward end of the plow beam to regulate the working depth of the plows. This depth regulation does not interfere with the adjustment for plow level, and on the other hand the level adjustment is independent of the depth adjustment. The lever 31 can be locked in its adjusted position by means of a grip-actuated latch 31ᵃ on said lever which engages a fixed notched quadrant 40 formed as a part of the bearing casting 33.

The plow-lifting mechanism is mounted on the upper side of the tractor frame and derives its power from the rear tractor axle, although the operation of this mechanism is controlled by the operator. The plow is suspended from a lift-arm 41 by means of a chain 42 by which it is raised, although when the plow is in working position in the ground the chain is slack so as not to take any of the weight of the plow. This chain is adjustably connected to a suitable bracket 43 on one of the plow beams, also connected to the end of the lift-arm. The lift-arm is triangular in shape to make it substantial and to provide a hook 44 by which it is locked in raised position. This arm is arranged to swing vertically and is pivoted at 45 between the flanges of two angle-members 46. These angle-members serve as a frame for the lifting mechanism and is fastened to the transverse plate 2 of the tractor frame by means of bolts 47. When the lifting arm is swung to its upper position to raise the plow out of the ground, as shown in dotted lines in Fig. 1, the hook 44 is adapted to engage the latch 48 to lock the arm. The latch is pivoted at 49 between the angle members 46 and is acted on by a spring 50 tending to keep it in the path of the hook 44. This latch has a foot-lever 51 by which the operator may swing the latch against the tension of the spring to release the lifting arm and allow the plow to drop into working position.

The tractor axle 5 has a ratchet wheel 52 fastened thereon and rotated thereby, and a yoke 53 embraces this ratchet and is rotatable on the axle. This yoke, however, may be connected with and disconnected from the ratchet by means of a pawl 54 pivoted in the yoke. The pawl is adapted to be thrown into engagement with the ratchet by means of a sliding latch bar 55, the forward end of which is positioned to actuate the pawl, and the rear end of which is pivotally connected at 56 to the latch member 48, whereby when the operator actuates the foot-lever it will connect the pawl with the ratchet. The yoke will be rotated by the ratchet wheel for a portion of a revolution, and will then be disconnected therefrom by a cam 57 which is engaged by the roller arm 58 on the pawl. Power is transmitted from this clutch mechanism to the lift-arm through the medium of links 59 and 59ᵃ. The link 59 is formed by a strap doubled back upon itself, and the links 59ᵃ are positioned alongside the link 59, and at their rear ends are spread to embrace the yoke to which they are pivotally connected by means of the pivot bolt 60 of the pawl. The links 59ª are fastened by means of bolts 59ᵇ to the sides of the link 59, but these bolts pass through elongated slots 59ᶜ in the links 59ª, so that the length of this transmitting device may be adjusted to time the locking up of the lifting arm without the disconnection of the pawl from the ratchet. The links 59 and 59ª are also connected together by the bolt 59ᵈ which passes through the bend in the link 59 and the cross-piece 59ᵉ fastened to links 59ª. This bolt has a head on one end and a threaded nut which is adjustable on the other end. This provides a positioned tension connection between said links 59 and 59ª to take the strain off the bolts and slot connections. The bolt and slot connections, however, keep the links properly alined. The rear ends of the links are provided with several pivoted links 61 which adopt the connection to the various angles which the lift-arm takes. These links 61 lay on the curved portion 62 of the lift-arm. This construction of the lifting arm maintains substantially the same radius throughout its rotation, and hence the leverage through which the links act remain substantially the same. Thus, it is observed that the operator merely needs to depress the foot-lever to engage the pawl with the ratchet to lift the plow and at the proper time the pawl is disconnected automatically by the arm. Furthermore, the same foot-lever is used to release the plow and allow it to lower into the ground.

I claim:—

1. The combination of a power-propelled tractor having rear supporting wheels, an axle therefor and a frame, a vertically swinging lift-arm pivotally mounted on said tractor-frame to the rear of said axle, a plow beam pivotally connected on the tractor frame and connected to said lift-arm to be raised thereby, a ratchet wheel on the tractor axle, a rotary arm loosely mounted on said axle and directly connected with said lift arm for actuating said lift-arm, a pawl carried by said rotary arm, lever mechanism for connecting the pawl with the ratchet wheel, an automatic device for disconnecting said pawl from the ratchet wheel, means for locking said beam in raised position, and means for releasing said locking means to thereby permit said beam to be lowered by gravity.

2. The combination of a power-propelled tractor having rear supporting wheels, an axle therefor and a frame, a vertically swinging lift-arm mounted on said tractor frame, a plow pivotally connected on the tractor frame and connected to said lift-arm to be raised thereby, a ratchet wheel on the tractor axle, a rotary arm loosely mounted on said axle, and connected with said lift-arm for actuating said lift-arm, a pawl carried by said rotary arm, a pivoted lever adapted to be operated to connect the pawl with the ratchet wheel, an automatic device for disconnecting said pawl from the ratchet wheel, means for locking the lift-arm to support the plow in its raised position, an operation of said lever operating to release said lift-arm and thereby permit said plow to be lowered by gravity.

Signed by me at Rock Island, Illinois, this 18 day of July, 1917.

HENRY J. HEIDER.